Sept. 21, 1943.                 E. A. RUTLEDGE                    2,329,788
                          VALVE OPERATING MECHANISM
                          Filed July 10, 1940        3 Sheets-Sheet 3

INVENTOR
Eric A. Rutledge
by Dann L. Wood
ATTORNEY

Patented Sept. 21, 1943

2,329,788

UNITED STATES PATENT OFFICE 2,329,788

VALVE OPERATING MECHANISM

Eric A. Rutledge, Troy, N. Y., assignor to Rensselaer Valve Company, Cohoes, N. Y., a corporation of New York Application July 10, 1940, Serial No. 344,740

7 Claims. (Cl. 74—22)

My invention more particularly relates to the operating mechanism for a valve of the cone type, though not necessarily limited thereto.

In the operation of a cone valve it is desirable first to lift the valve axially from its seat whether it is in the open or closed position, and then move the valve spirally and finally rotate the valve and again to reseat the valve with a reverse movement.

One of the objects of my invention is a mechanism for operating a valve of the foregoing character which comprises a valve stem having two sections and a swivel coupling interposed between the two sections. Means are also associated with one of said sections for moving the section and the valve axially and a second means is associated with the other section of the valve stem for imparting rotary movement only to the valve.

The means which I employ for moving one of the sections of the valve stem axially and for rotating the other section of the valve stem comprises, in the embodiment of my invention illustrated, toothed sectors which mesh with respective racks of a rack bar.

Another object of my invention is a mechanism of the foregoing character which is characterized by its simplicity in design and operation and ease in its manufacture and which provides for ready accessibility and inspection of parts.

Other objects of my invention will appear in the specification and the novel features thereof will be particularly pointed out in the claims.

My invention will best be understood by reference to the accompanying drawings in which Fig. 1 is a vertical section through the valve and its operating mechanism;

Like reference characters indicate like parts throughout the drawings.

Figure 1:
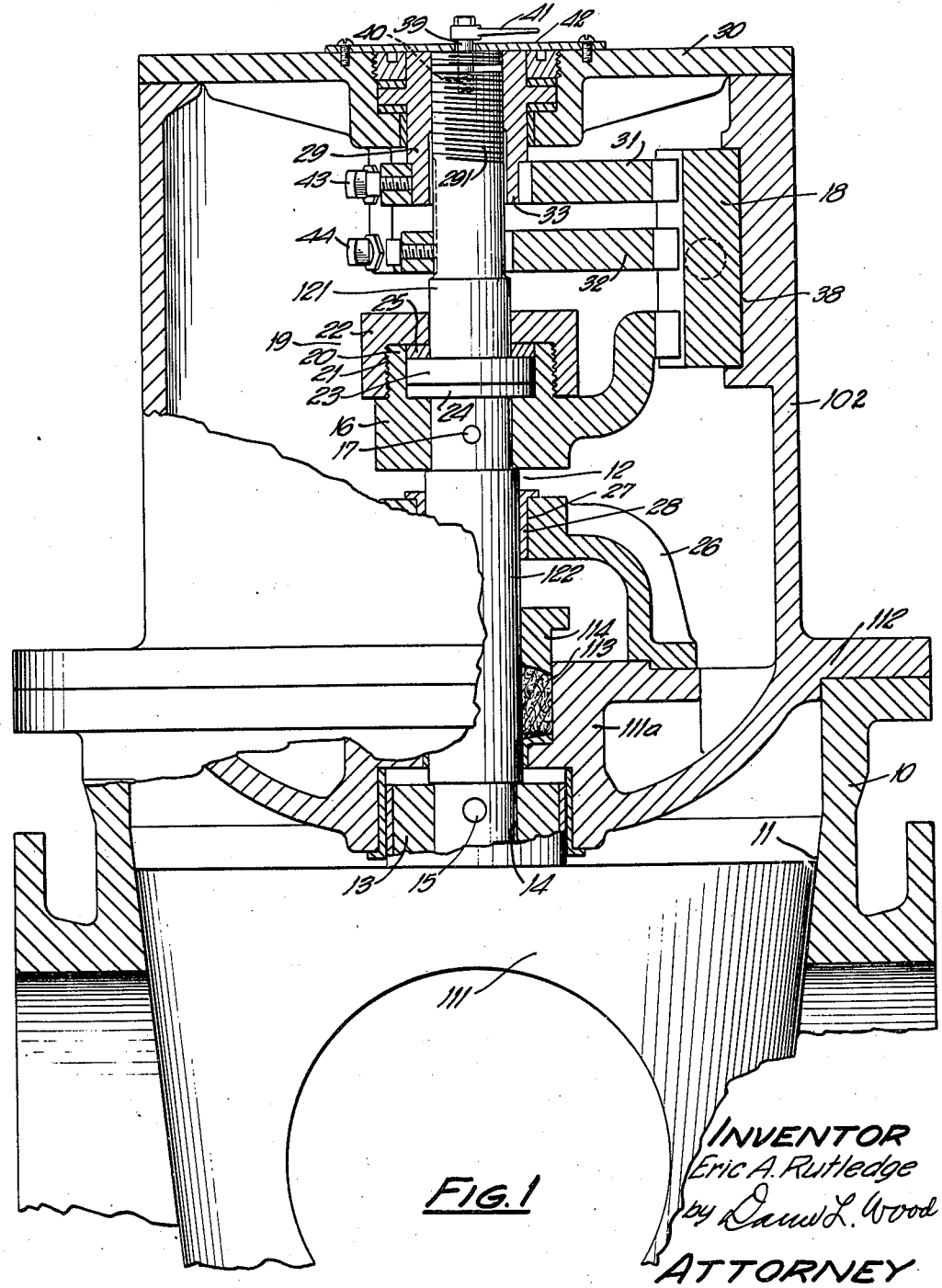

Referring to the drawings, a valve housing 10 is provided with a valve seat 11 for a cone or plug 111 which is actuated by a valve stem 12 comprising an upper or outer section 121 and an inner or lower section 122, the latter section being secured to the valve plug 111. The valve is provided with a boss 13 formed with an opening 14 in which the lower end of the valve stem is received and to which it is pinned or otherwise secured, as at 15.

In accordance with my invention means are provided for permitting independent rotary movement of the two sections of the valve stem and for permitting axial movement thereof only when the two sections of the valve stem are moved axially together. A toothed sector 16 is pinned or otherwise secured to the lower section of the valve stem as at 17. The teeth of said sector engage one rack bar 161 of a plurality of racks that are formed on a rack bar 18 which is movable at right angles to the valve operating stem as indicated in Figs. 1 and 3 to 8. A swivel coupling indicated generally at 19 is interposed between the two sections 121 and 122 of the valve stem. The toothed sector 16 is provided at its upper surface with an upwardly extending boss 20 which is screw threaded as at 21 on its outer surface and receives a nut 22 which is threaded on the boss 20 and forms an inclosure for the swivel coupling. The upper section 121 of the valve stem is formed at its lower end with a disc 23 which is received in a recess in the boss 20, a disc 24 being disposed between the disc 23 and the toothed sector 16 and a ring 25 being interposed between the disc 23 and the enclosing nut 22.

A bracket 26 is secured to the interior of the valve operating mechanism housing 102 for the operating mechanism as best shown in Fig. 1 and is provided with an opening 27 in which is received a bearing sleeve 28 for the lower section 122 of the valve stem. The upper section of the valve stem is threaded at its upper end as at 291 into a nut 29 which is mounted in the head or cover 30 of the valve operating mechanism housing. The bracket 26 is mounted on a support 111a of the housing which support forms a cover 112 for the valve and is provided with a recess 113 in which is mounted a split gland 114 surrounding the lower section 122 of the valve stem.

A toothed sector 31 which is mounted on and secured to a downwardly extending sleeve 33 integral with the nut 29 engages a rack 311 on the rack bar.

Figure 2:
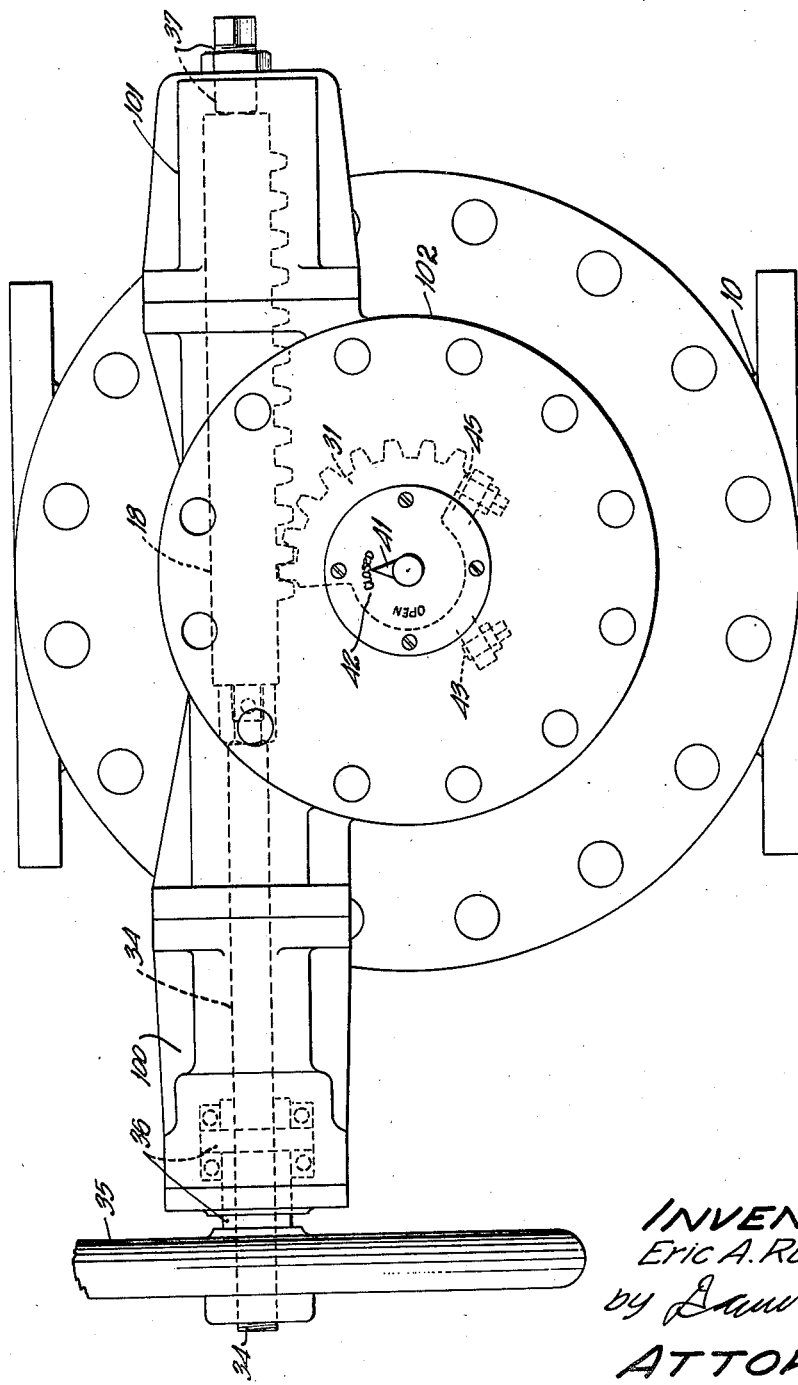
Fig. 2 is a front view of the housing and extensions thereof and illustrating the rack bar and certain associated parts in dotted lines.

In the embodiment of my invention illustrated, the rack bar 18 is actuated by a threaded operating stem 34 which passes through an extension 100 which is secured to the valve operating mechanism housing as best indicated in Fig. 2. The threaded stem 34 is threaded in a nut 36 which is rotatably supported in the extension 100 of the valve operating mechanism housing, the inner end of the stem being suitably secured to one end of the rack bar 18. Nut 36 is operatively fastened to a hand wheel 35 through which stem 34 freely passes. Hence, an operation of wheel 35 will rotate nut 36 and effect axial movement of stem 34. The opposite end of the rack bar may engage an adjustable stop 37 at one end of its movement. The stop 37 may conveniently be mounted in an extension 101 mounted on the opposite side of the valve housing from the extension 100. Operation of the hand wheel 35, thus actuates the stem 34 and the rack bar to which it is attached. The valve operating mechanism housing is provided with a groove 38 in which the rack bar is received and along which it slides.

Figure 3:
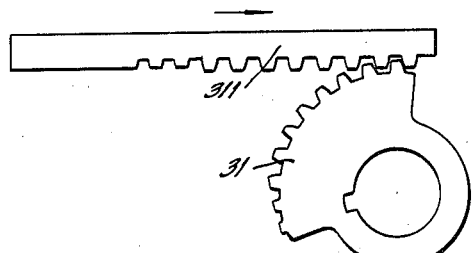
Figs. 3, 4, 5, 6, 7 and 8 illustrate various positions of the three rack bars and the three toothed sectors which mesh therewith and which correspond to various positions of the valve operating means.
Figure 6:
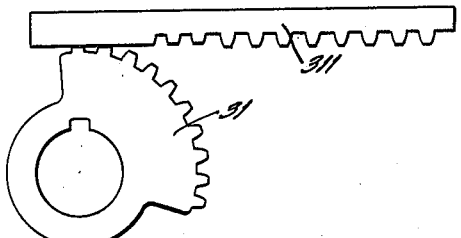
Figure 5:
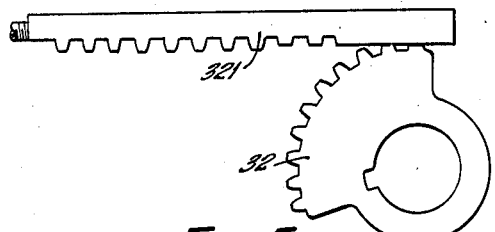
Figure 7:
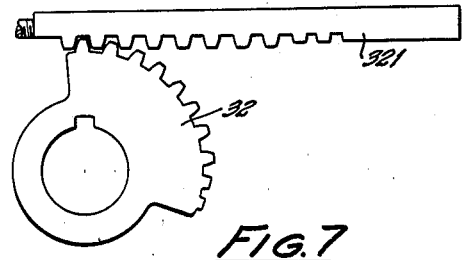
Figure 4:
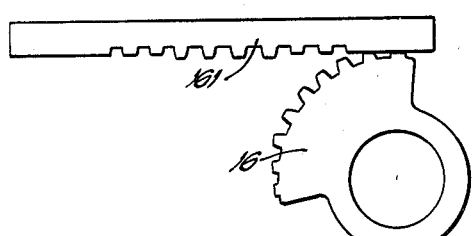
Figure 8:
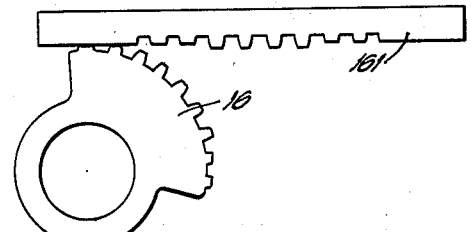
Figure 9:
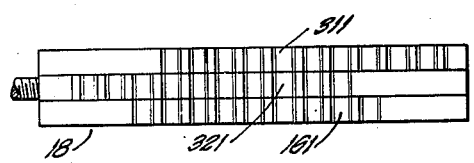
Fig. 9 is a plan view of the rack bar.

Figs. 3 to 5 illustrate the toothed sectors and the associated rack in the relative positions that they occupy when the valve is seated in the open position and Figs. 6 to 8 the positions the same parts occupy when the valve is in the closed seated position.

Assume, now that the valve is in its open seated position and is to be moved to its closed seated position. When the rack bar 18 is moved in the direction indicated by the arrow in Fig. 3, the toothed sector 31 which is now in mesh with the associated rack 311 is rotated clockwise and correspondingly rotates the nut 29 on which it is mounted. Due to the threaded connection between the upper end of the upper section 121 of the valve stem and the nut, the valve stem is carried upwardly to the unseated position. After a predetermined distance of travel of the rack bar 18, the toothed sector 16 is picked up by the rack bar 161 with the result that the lower section of the valve stem is rotated thereby rotating the valve and as the teeth of the sector 31 are still in engagement with the teeth of the associated rack 311 the valve stem is also lifted resulting in an upward spiral movement of the valve. Further movement of the rack bar 18 causes the teeth of the sector 32 to engage the teeth of the rack bar 321. At this time all three sectors are engaged by their respective racks and all three sectors are rotated. As the nut 29 and the upper stem 121 of the valve stem are rotated in the same direction, the two movements may substantially neutralize each other and then there is no axial movement of the valve stem. The sector 16, however, which still meshes with its assorciated rack 161 rotates the lower section 122 of the valve stem resulting in a rotary movement only of the valve. This movement continues until the valve is carried approximately to its closed position at which point sector 31 is disengaged from its associated rack 311 (Fig. 6) with the result that nut 29 ceases to rotate. Since toothed sectors 16 and 32 are still in engagement with their associated respective racks 161 and 321 the valve is subjected to a combined axial and rotary valve movement which carries the valve downward, the rotary movement being the reverse of that during its upward movement as it is produced by the rotary movement of the upper section of the valve stem rather than by the nut, and the valve is moved spirally downward. Before reaching the fully seated position, sector 16 is disengaged from its rack 161 (Fig. 8) with the result that the valve ceases to rotate but is moved axially to its seat by the continued rotation of the upper section of the valve stem by engagement of rack 321 with the sector 32, the rotation of the upper section of the valve stem moving it axially downward due to its threaded engagement with the nut 29.

The unseating, turning and reseating motion is thus obtained through the combination of the three toothed sectors and the associated racks provided with teeth specially machined and working in conjunction with the rotatable nut 29, valve stem 12 and the teeth of the respective toothed sectors which are cut away in the manner described above, and with which the swivel coupling in the valve stem cooperates.

It is to be noted that, as hereinbefore pointed out, the plug-operating stem of my valve comprises upper and lower sections which may rotate relative to each other through the medium of the coupling 19. Furthermore, since the toothed sectors 31 and 32 are operatively connected with the nut 29 and upper section 121 of the valve stem, respectively, and the toothed sector 16 is secured to the lower section 122 of the valve stem, axial movement is imparted to the plug 111 through an operation of the rack bar and sectors 31 and 32 while rotary movement of the plug is effected through an operation of sector 16. Hence, the sectors and their associated toothed portions of the rack 18 need not necessarily be precisely designed, and close, relative adjustment of these parts in assembling is unnecessary in order to provide the desired movement of the plug, that is, pure axial movement thereof from its seated position and thereafter rotary or combined axial and rotary movement. Therefore, the operating parts of my valve may be produced at a low manufacturing cost and assembly of the valve parts may be expeditiously accomplished.

The upper end of the upper section 121 of the valve stem is preferably provided with means which afford an indication of the closed and open positions of the valve. A stem 39 is secured to the upper end of the section 121 of the valve stem as by screwing the lower threaded end 40 thereof into a threaded recess in the valve stem. To the upper end of the stem 40 is attached a pointer 41 which moves over a dial 42 on which "Closed" and "Open" may be applied.

The valve and the operating mechanism therefor are characterized by their simplicity in operation and design, ease in manufacture and a structure which provides easy access. Sufficient power may readily be applied through the operating mechanism, either manually or automatically, positively to unseat the cone valve when in either the open or closed position and continued movement thereof until the cycle of operation is completed.

By reducing axial movement to a minimum and combining axial and rotary movement in a spiral motion the length of the complete operating stroke is materially shortened thereby reducing material costs and labor in its manufacture. Another advantage of the short axial movement plus the spiral unseating movement is the tendency to cleanse the seating surfaces.

Suitable stops 43, 44, 45 and a fourth stop (not illustrated) are preferably provided to limit the movement of the sectors 31 and 32.

While I have described my invention in its preferred embodiment, it is to be understood that the words which I have used are words of description rather than of limitation. Hence, changes within the purview of the appended claims may be made without departing from the true scope and spirit of my invention in its broader aspects.

What I claim is:

1. A valve-operating mechanism of the character described for the tapered plug of a valve comprising a pair of axially aligned shafts, means forming a swivel coupling for connecting said shafts together, said coupling permitting relative rotary movement of said shafts but preventing relative axial movement thereof, a first of said shafts being adapted to be connected to said plug and the second of said shafts being provided with screw threads, a rotatably mounted nut arranged to engage the threads on said second shaft and said nut being fixed against movement axially of said second shaft, means for rotating said nut, means operatively connected with said second shaft for rotating the same and means operatively connected with said first shaft for rotating the same; whereby relative rotation of said nut and said second shaft will produce purely an axial movement of said first shaft and said plug, when connected thereto, and an operation of said last mentioned means will produce rotation of said first shaft.

2. A valve-operating mechanism of the character described for the tapered plug of a valve comprising a pair of axially aligned shafts, means forming a swivel coupling for connecting said shafts together, said coupling permitting relative rotary movement of said shafts but preventing relative axial movement thereof, a first of said shafts being adapted to be connected to said plug and the second of said shafts being provided with screw threads, a rotatably mounted nut arranged to engage the threads on said shaft and said nut being fixed against movement axially of said shaft, a first toothed sector secured to said nut, a second toothed sector mounted on said second shaft, a third toothed sector secured to said first shaft, and a rack bar adapted to mesh with and rotate said sectors; the teeth of said rack bar and sectors being so constructed and relatively arranged that upon an operation of said rack bar said first shaft and said plug, when connected thereto, will be first moved purely in an axial direction to lift the plug from its seat and thus rotated.

3. A valve-operating mechanism of the character described for the tapered plug of a valve comprising a pair of axially aligned shafts, means forming a swivel coupling for connecting said shafts together, said coupling permitting relative rotary movement of said shafts but preventing relative axial movement thereof, a first of said shafts being adapted to be connected to said plug and the second of said shafts being provided with screw threads, a rotatably mounted nut arranged to engage the threads on said shaft and said nut being fixed against movement axially of said shaft, means for rotating said nut whereby to effect a rotation and axial movement of said second shaft and an axial movement of said first shaft and means for rotating said first shaft; said nut and shaft-rotating means being so constructed, correlated and arranged as to produce first a purely axial movement of said first shaft and said plug, when connected thereto, to lift the plug from its seat and thereafter a rotary movement of said first shaft and plug.

4. A valve-operating mechanism of the character described for the tapered plug of a valve comprsing first and second axially aligned shafts, means forming a swivel coupling for connecting said shafts together, said coupling permitting relative rotary movement of said shafts, means connected to the first of said shafts for rotating the same independently of the other, and means connected to the second of said shafts for moving said shafts bodily axially, the first of said shafts being connected to said valve for rotating the same.

5. In a valve operating mechanism of the character described comprising first and second axially aligned shafts, means forming a swivel coupling between said shafts whereby they may be relatively rotated but may be moved axially together, a cone valve, means for connecting said first shaft to said cone valve whereby they are moved axially together, means for rotating the first of said shafts independently of the second, and means connected to the second of said shafts for moving both of said shafts axially together.

6. In a valve operating mechanism of the character described for the tapered plug of a valve operating mechanism comprising first and second axially aligned shafts, a swivel coupling connecting said shafts together whereby they may be relatively rotated and may be moved axially together, means connected to the first of said shafts for rotating said first shaft independently of the second of said shafts, the first of said shafts being secured to said valve, a rotatable but non-axially movable nut, said second shaft being provided with screw threads engageable with the threads of said nut, whereby said first and said second shafts may be independently rotated but moved axially together.

7. In a device of the character described for the tapered plug of a valve operating mechanism comprising first and second axially aligned shafts, a swivel coupling connecting said shafts together, means for connecting the first of said shafts to said valve, means connected to said first shaft for rotating the same independently of the other, a rotatable but non-axially fixed nut, and means for holding said nut and rotating said shaft whereby said shafts are moved axially together, and means for preventing rotation of said shaft and permitting rotation of said nut whereby said shafts are axially movable together in the opposite direction.

ERIC A. RUTLEDGE.